Patented Aug. 23, 1938

2,128,161

UNITED STATES PATENT OFFICE 2,128,161

WELL TREATING FLUID

Leo Clark Morgan, Wichita, Kans.

No Drawing. Application July 18, 1938,
Serial No. 219,829

11 Claims. (Cl. 166—21)

The present application is a continuation in part of my pending application Serial No. 160,447, filed August 23, 1937.

The present invention relates to the treatment of wells with acids for the purpose of increasing the production thereof, and has particular reference to an oil well treating fluid of improved properties.

As is well known, in the common method of treating oil wells for the purpose of increasing the rate of production thereof, a charge of acid is introduced into the well, and after the acid has eroded the adjacent acid soluble earth or rock formation, the spent treating fluid is withdrawn. Although well treating fluids of the prior art have greatly increased the production, they have not been altogether satisfactory in actual use. The treating fluids normally employed comprise commercial muriatic acid which contains a small amount of sulfuric acid. Furthermore, sulfates are present in the usual earth formation. The sulfate ions from either or both of these sources combine with the lime in the earth formation during the acidizing treatment, to form an insoluble precipitate which is probably calcium sulfate (gypsum) or a double salt of calcium sulfate and calcium chloride. The precipitation of this insoluble material in the pores of the earth or rock formation masks the further effectiveness of the acid, interferes with the subsequent removal of the spent acid, and retards the flow of oil from the well after treatment. Moreover, the prior treating fluids break up the suspension of mud normally present in an oil well, the precipitated mud likewise clogging the pores of the earth formation.

In addition to the foregoing disadvantages, the treating fluids of the prior art react rapidly as soon as the acid is brought into contact with the earth formation. The acid which is being forced back into the earth formation therefore rapidly spends itself. As a result, the prior acids have a more or less local action and do not satisfactorily erode the formation at points remote from the bore hole.

The principal object of the present invention is to provide an improved well treating fluid which obviates the disadvantages of prior reagents of this character.

A further object is a well treating fluid which avoids the clogging of the pores of the earth formation during the period of treatment of the well.

A still further object is a method of treating oil wells for the purpose of increasing the production thereof, by means of a treating fluid which prevents the precipitation of calcium sulfate in the pores of the earth formation undergoing treatment.

Another object is a well treating fluid which prevents precipitation of calcium salts and which also maintains the mud normally present in an oil well in a dispersed or suspended condition during the period of acid treatment.

Another object is a well treating fluid which is retarded in its initial rate of reaction so that points remote from the bore hole are effectively eroded during the period of treatment.

Other objects will be apparent as the invention is hereinafter more fully described.

The foregoing and other objects may be accomplished by the well treating fluid of the present invention, which comprises an acid capable of forming water-soluble salts with the earth formation, said acid containing a small proportion of a corrosion inhibitor such as those described by Grebe et al. in United States Patent No. 1,877,504. In order to prevent the clogging of the pores of the earth formation with insoluble calcium salts, there is also added a small proportion of a calcium sequestering agent—i. e., an agent which sequesters, "locks up", or suppresses the calcium ions, apparently in the form of un-ionized salt or complex, so that insoluble calcium salts such as sulfate are either prevented from forming or held in solution or suspension after formation. In addition, a small proportion of a mud peptizing agent may also be added, if desired, in order to maintain the mud normally present in an oil well in dispersed or suspended condition.

The acid which forms the major constituent of my improved well treating fluid comprises any acid material which is capable of forming water soluble salts with the earth formation. Preferably I employ hydrochloric acid, for example, commercial or muriatic acid, because of the economic availability of this material. It is to be understood, however, that I do not intend to be restricted to this particular mineral acid, since it is apparent to anyone skilled in the art that many other acids such as the other hydro halides, for example, hydrobromic acid, may be employed for this same purpose.

A large number of calcium sequestering agents are available, and these may be employed in accordance with the present invention. These materials may be classified roughly into two types:
(1) Those containing or producing the meta phosphate ion, and
(2) Those not containing or producing the meta phosphate ion.

The latter class may conveniently be further classified into two sub-classes.
(a) Nitrogen containing phosphorus derivatives;
(b) Synthetic organic detergents.

In general, I prefer to employ the calcium sequestering agents of type (1), inasmuch as these compounds are relatively inexpensive in commercial quantities at the present time. The other agents, however, may be satisfactorily employed where conditions justify the increased cost attended with their use.

As examples of the meta phosphate containing or producing materials, the following may be mentioned:

Table I

| Formula | Name | Product in acid |
|---|---|---|
| $HPO_3$ | Monometaphosphoric acid | $(HPO_3)_n$ |
| $H_6P_6O_{18}$ | Hexametaphosphoric acid | $(HPO_3)_n$ |
| $NaPO_3$ | Sodium monometaphosphate | $(HPO_3)_n$ |
| $Na_6P_6O_{18}$ | Sodium hexametaphosphate | $(HPO_3)_n$ |
| $Na_6P_6O_{18}$ | Mixture of sodium hexa meta and Pyro phosphate | $(HPO_3)_n$ |
| $Na_4P_2O_7$ | | |
| $H_5P_4O_{13}$ | Tetraphosphoric acid | $(HPO_3)_n$ |
| $Na_5P_4O_{13}$ | Sodium tetraphosphate | $(HPO_3)_n$ |
| $P_2O_5$ | Phosphorus pentoxide | $(HPO_3)_n$ |
| $POCl_3$ | Phosphorus oxichloride | $(HPO_3)_n$ |
| $PONHOH$ | Imidoposphoric acid | $(HPO_3)_n$ |

(Where $n=$a small whole number.)

As an example of the materials of type (2) (a), according to the foregoing classification, the following materials may be mentioned:

Table II

| Formula | Name | Product in acid |
|---|---|---|
| $(NH_2)_2P_2O_3(OH)_2$ | Diamidodiphosphoric acid | $(NH_2)_2P_2O_3(OH)_2$ |
| $(HO)_2PO.O.OPONH_2OH$ | Tetrabasic monoimidodiphosphoric acid | $(HO)_2PO.O.OPONH_2OH$ |
| $NH(PO.OH)_2O$ | Dibasic imidodiphosphoric acid | $NH(PO.OH)_2O$ |
| $P_3N_3O_6H_3Na_3$ | Trisodium trimetaphosphamate | $P_3N_3O_6H_6$ |
| $P_4N_4O_8H_4(NH_4)_4$ | Tetra-ammonium tetrametaphosphamate | $P_4N_4O_8H_8$ |
| $P_{11}N_{11}O_{22}H_{11}Na_{11}$ | Henasodium henametaphosphamate | Diimidotriphosphoric acid |
| | | Triimidotetraphosphoric acid |
| | | Tetrametaphosphimic acid |
| $P_{11}N_{11}Cl_{22}$ | Henaphosphonitrilic chloride | |

By way of example of the calcium sequestering agents of type (2)(b), i. e., the synthetic organic detergents, the following may be mentioned for the purpose of illustration: the long chain fatty alcohol alkali metal sulfates such as sodium oleyl sulfate, for example, that sold by Du Pont under the name of "Gardinol L S Flakes"; the long chain fatty acid-taurine condensation products such as the oleic acid-taurine products sold by the General Dyestuff Corporation, under the trade name of "Igepon T" or that sold by Colgate Palmolive-Peet under the trade name of "Syntex M". The calcium sequestering properties of these organic detergents are in general not as great as those of the compounds in type (1) and type (2)(a). However, these materials may be employed with beneficial results, if desired.

A well treating fluid prepared from the calcium sequestering agents of type (1) should be used promptly after the agent is added to the acid, in view of the fact that the meta phosphate type fails to perform in the desired manner after a few hours. It has been found, however, that after the treating fluid comprising the meta phosphate type is brought into contact with the earth formation, the effectiveness of the agent sequestering the calcium is maintained for several days. For some unknown reason, the sequestering powers of the hexa meta phosphate is not destroyed except when the treating fluid is freshly prepared and stored out of contact with the earth formation.

The well treating fluid prepared from the calcium sequestering agents of type (2)(a) appear to be significantly more stable as a class than the meta phosphate containing treating fluids. In general, the agents of type (2)(a) are more stable in hydrochloric acid than those of type (1). This stability is particularly apparent with tetrabasic monoimidodiphosphoric acid and henasodium henametaphosphamate which have been kept in 15% hydrochloric acid for a period of days without destruction of the effectiveness of the agents for calcium sequestration.

The phosphonitrilic chlorides having the general formula $(PNCl_2)_n$ are insoluble in acid, with the exception of the polymer where $n=11$. These compounds, however, serve as starting materials for the preparation of some of the soluble acids. The exception noted, i. e., the henaphosphonitrilic chloride, when shaken with a 15% solution of hydrochloric acid, will produce calcium sequestering solution. For a discussion of the preparation and properties of certain of the materials of type (2)(a), reference may be had to Mellor's "Treatise on Inorganic Compounds", Vol. VIII, pp. 704-724. A number of these compounds are now commercially available.

As indicated above in the general discussion of the calcium sequestering agents, I prefer, for economic reasons, to utilize the agents of type (1) such as the alkali metal meta or pyro phosphates, for example, the sodium, potassium, lithium, or ammonium salts; or the corresponding free acids; or the anhydrides of such acids. Of these, the meta phosphates, and particularly the water soluble hexa meta phosphate commonly called deliquescent, vitreous, or Graham's meta phosphate, constitute preferred embodiments of the present invention. The alkali metal hexa meta phosphates may be prepared according to the methods well known in the art, for example, as shown by Roscoe & Schorlemmer in "A Treatise on Chemistry", Vol. II, part 1, page 283, 1923 edition. A surprisingly small amount of the sodium hexa meta phosphate is effective in completely sequestering the calcium and thereby preventing the precipitation of an insoluble calcium salt when a calcareous material such as limestone is treated with muriatic acid. Using commercial muriatic acid diluted to 15% strength, I have found that as little as 0.015% sodium hexa meta phosphate is sufficient to achieve the desired effect.

Where it is desired to maintain the mud present in the oil well in a dispersed or suspended condition during the period of acid treatment, in addition to the calcium sequestering agent or agents, I may employ a mud peptizing agent such as those described and claimed in my pending application Serial No. 160,447, filed August 23, 1937. For a more complete discussion of such mud peptizing agents, reference may be had to the aforesaid pending application. In general, however, such mud peptizing agents include protective colloids, proteins, or proteids, as well as soluble and partly soluble carbohydrates and certain metal salts of organic acids. By way of example of the mud peptizing agents, the following may be mentioned: glue, Lysalbinic acid, Protalbinic acid, isinglass, albumen, starch, sugar, gelatin, agar, gum acacia, gum arabic, sodium citrate, Rochelle salts, and the like. Preferably, however, I employ glue, starch or gelatin, since these materials are relatively cheap. As little as 0.15% of these materials is sufficient to maintain the mud in suspension. Of these three materials, glue and gelatin are preferable, inasmuch as starch tends to hydrolize in the acid solution.

In order to explain the nature of the present invention yet more clearly, a specific embodiment thereof will now be described. It is to be clearly understood, however, that this is done solely by way of example, and is not to be construed as a limitation upon the spirit and scope of the present invention, which has many important embodiments other than that hereinafter particularly described.

A preferred embodiment of the present invention comprises commercial hydrochloric acid such as muriatic acid, diluted to 15% strength. To this solution is added a small amount of sodium hexa meta phosphate, and a small amount of mud peptizing agent such as glue or gelatin. In general, amounts of calcium sequestering agent and the mud peptizing agent in excess of 1% are not necessary, and indeed, as little as 0.015% of each of these agents has been found effective in many cases. If desired, any of the usual type of inhibitors to prevent the corrosion of the metallic equipment may be added to the composition in order to minimize the action of the acid on the metal parts of the equipment used in treating the well. The resulting solution is highly effective, not only in preventing the precipitation of insoluble calcium sulfate and in maintaining the mud in suspension, but also in reaching points remote from the bore hole with the eroding fluid. As pointed out above, the retardation of the acid is a desirable property in order to obviate localized action. For reasons which are not clearly understood, the well treating fluid of the present invention exhibits to a high degree the retarded effect which is necessary in eroding the earth formation at points remote from the bore hole.

The solution of the preferred embodiment shows a capillary rise of 7.7% less than that of muriatic acid of a comparable strength which does not contain the calcium sequestering agent or the mud peptizing agent. The time of flow of the solution in accordance with my invention, through an Ostwald viscometer was 2.9% greater than that observed for muriatic acid which did not contain the calcium sequestering agent or the mud peptizing agent.

I am aware that calcium sequestering agents have been used heretofore for various industrial purposes. Thus, Hall in United States Patent No. 1,956,515, proposes to employ sodium hexa meta phosphate for the purpose of treating water used in steam boilers or in laundering fabrics. So far as I am aware, however, no one has employed calcium sequestering agents of any type in a treating fluid adapted to be introduced into the bore hole of a well, for the purpose of increasing the rate of production thereof. The properties of the resultant fluid, particularly as regards the retarded action of the acid and the striking results which have been obtained from the treatment of wells with the fluid of the present invention, were clearly unexpected and, indeed, the advantageous properties of my treating fluid are difficult to account for even in retrospect. However, regardless of the explanation, the treating fluid of the present invention has been found in numerous instances to substantially increase the rate of production of wells which have failed satisfactorily to respond to the treating fluids of the prior art.

In the foregoing detailed description of the present invention it will be apparent that many variations may be made without departing from the spirit and scope thereof. Thus, for example, although I have illustrated the invention by means of certain specific examples of calcium sequestering agents, it will be evident that other agents of this class may be substituted for those particularly described, inasmuch as the calcium sequestering agents as a class are applicable to the present invention. Furthermore, the resultant well treating fluid of the present invention may be used in combination with other types of treating fluids in the manner well known in the art. Thus, for example, in restoring the porosity of mudded well bores, it may be found desirable to impregnate the mud coated bore hole throughout at least a portion of its length with the sequestered treating fluid of the present invention, and thereafter to introduce into the bore hole a second solution capable of reacting with the acid to generate a gas—for example, a sodium carbonate solution—the evolved gas disrupting the mud coating and thereby promoting the influx of oil from the surrounding oil producing earth formation. If preferred, the carbonate solution or its equivalent may be employed first and the acid solution of the present invention may be thereafter introduced into the bore hole. All such methods of treatment are contemplated within the present invention, although the customary process of treating the earth formation for the purpose of eroding the same and thereby release mechanically occluded oil from the producing formation, constitutes the preferred application of the present treating fluid.

Many other variations in the method of employing the present well treating fluid will be apparent to those skilled in the art. I therefore intend to be restricted only in accordance with the following patent claims.

I claim:

1. A well treating fluid comprising an acid capable of forming a water soluble salt with the earth formation, said acid containing a calcium sequestering agent, whereby to prevent the formation of insoluble calcium salts when said fluid has spent itself in a calcareous earth formation.

2. A well treating fluid comprising an acid capable of forming a water soluble salt with the earth formation, said acid containing a small proportion of a meta phosphoric acid as a calcium sequestering agent, whereby to prevent the formation of insoluble calcium salts when said fluid has spent itself in a calcareous earth formation.

3. A well treating fluid comprising an acid capable of forming a water soluble salt with the earth formation, said acid containing a member of the group consisting of the phosphonitrile chlorides, the meta phosphimic acids, the amido phosphoric acids, and the water soluble salts of said acids.

4. A well treating fluid comprising an acid capable of forming a water soluble salt with the earth formation, said acid containing as a calcium sequestering agent a small proportion of an alkali metal akyl sulfate.

5. A well treating fluid comprising an acid capable of forming a water soluble salt with the earth formation, said acid containing a corrosion inhibitor, a calcium sequestering agent, and a mud peptizing agent, whereby to prevent the clogging of the pores of the earth formation with mud and the formation of insoluble calcium salts when said treating fluid has spent itself in the earth formation.

6. A well treating fluid comprising an acid capable of forming a water soluble salt with the earth formation, and a water soluble meta phosphate.

7. The well treating fluid of claim 6 wherein said water soluble meta phosphate consists of hexa meta phosphoric acid.

8. A well treating fluid comprising a major proportion of halogen acid capable of forming a water soluble salt with the earth formation, said acid containing a small proportion of hexa meta phosphoric acid and a small proportion of a protective colloid.

9. A well treating fluid comprising a major proportion of muriatic acid containing less than 1% hexa meta phosphoric acid, and less than 1% of a protective colloid.

10. The well treating fluid of claim 9 wherein said protective colloid consists of a member of the group consisting of starch and gelatin.

11. The method of treating oil wells which comprises dissolving the earthy substances in the same by means of an acid capable of forming soluble compounds thereof while preventing the formation of insoluble calcium compounds by the presence of a calcium-sequestering chemical in the acid.

LEO CLARK MORGAN.

DISCLAIMER 2,128,161.—*Leo Clark Morgan*, Wichita, Kans. WELL TREATING FLUID. Patent dated August 23, 1938. Disclaimer filed July 3, 1939, by the patentee.

Hereby disclaims from the scope of claim 4 any and all alkali metal alkyl sulfates except those containing the oleyl group.

[*Official Gazette July 25, 1939.*]